United States Patent
Hosoda et al.

(10) Patent No.: US 7,657,096 B2
(45) Date of Patent: Feb. 2, 2010

(54) GENERATION OF DIGESTED IMAGE DATA (75) Inventors: Tatsuya Hosoda, Nagano-ken (JP);
Junichiro Shinozaki, Nagano-ken (JP);
Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1079 days.

(21) Appl. No.: 11/084,539

(22) Filed: Mar. 16, 2005

(65) Prior Publication Data
US 2005/0232489 A1 Oct. 20, 2005

(30) Foreign Application Priority Data
Mar. 22, 2004 (JP) .............................. 2004-082481

(51) Int. Cl.
G06K 9/46 (2006.01)
G06K 9/62 (2006.01)

(52) U.S. Cl. ................. 382/190; 382/224; 348/135; 348/700

(58) Field of Classification Search ............... 382/190, 382/224; 348/135, 700
See application file for complete search history.

(56) References Cited

U.S. PATENT DOCUMENTS

| 5,818,439 | A | 10/1998 | Nagasaka et al. |
| 7,068,722 | B2 * | 6/2006 | Wells ................... 375/240.16 |
| 7,243,101 | B2 | 7/2007 | Itou |
| 2004/0170321 | A1 * | 9/2004 | Gong et al. ................ 382/173 |
| 2004/0223052 | A1 * | 11/2004 | Sugano et al. ............... 348/70 |
| 2005/0108745 | A1 * | 5/2005 | Linzer ........................ 725/19 |
| 2006/0110028 | A1 * | 5/2006 | Liu et al. .................... 382/159 |

FOREIGN PATENT DOCUMENTS

| JP | 08-087870 | 4/1996 |
| JP | 08-292965 | 11/1996 |
| JP | 10-224736 | 8/1998 |
| JP | 2002-142189 | 5/2002 |
| JP | 2003-216621 | 7/2003 |
| JP | 2004-040355 | 2/2004 |

OTHER PUBLICATIONS

Chang et al. "Structural and Semantic Analysis of Video." ICME 2000, 2000 IEEE International Conference on Multimedia and Expo, vol. 2, Jul. 30, 2000-Aug. 2, 2000, pp. 687-690.*
Abstract of Japanese Patent Publication No. 2003-216621, Pub. Date: Jul. 31, 2003, Patent Abstracts of Japan.

(Continued)

*Primary Examiner*—Jon Chang
(74) *Attorney, Agent, or Firm*—Martine Penilla & Gencarella, LLP (57) ABSTRACT

A method of extracting at least a portion of moving image data from supplied moving image data is provided. The method includes (a) a moving image evaluation step of generating moving image evaluation data by evaluating the supplied moving image data, the evaluation being chronologically performed based on a prescribed condition, (b) a moving image data extraction step of extracting the at least a portion of moving image data from the supplied moving image data based on the moving image evaluation data, and (c) a moving image data classification step of classifying the extracted moving image data into a plurality of classes based on the moving image evaluation data.

2 Claims, 7 Drawing Sheets

OTHER PUBLICATIONS

Abstract of Japanese Patent Publication No. 10-224736, Pub. Date: Aug. 21, 1998, Patent Abstracts of Japan.
Abstract of Japanese Patent Publication No. 2002-142189, Pub. Date: May 17, 2002, Patent Abstracts of Japan.
Abstract of Japanese Patent Publication No. 08-292965, Pub. Date: Nov. 5, 1996, Patent Abstracts of Japan.
Abstract of Japanese Patent Publication No. 2004-040355, Pub. Date: Feb. 5, 2004, Patent Abstracts of Japan.
Abstract of Japanese Patent Publication No. 08-087870, Pub. Date: Apr. 2, 1996, Patent Abstracts of Japan.

* cited by examiner

| SCENE NUMBER | START TIME | END TIME | REPLAY TIME PERIOD |
|---|---|---|---|
| 1 | 00:00:00:00 | 00:00:23:24 | 00:00:23:24 |
| 2 | 00:00:23:25 | 00:00:47:02 | 00:00:23:07 |
| 3 | 00:00:47:03 | 00:01:12:12 | 00:00:25:09 |
| 4 | 00:01:12:13 | 00:01:13:15 | 00:00:01:02 |
| ⋮ | | | |

Fig.6(a)

| RANK | MINIMUM VALUE | MAXIMUM VALUE |
|---|---|---|
| 1 | 0.80 | — |
| 2 | 0.70 | 0.79 |
| 3 | 0.60 | 0.69 |

Fig.6(b)

| SCENE NUMBER | SCENE EVALUTION VALUE | RANK |
|---|---|---|
| 1 | 0.91 | 1 |
| 2 | 0.55 | OUTSIDE EXTRACTION TARGET RANGE |
| 3 | 0.78 | 2 |
| 4 | OUTSIDE EVALUATION RANGE | OUTSIDE EXTRACTION TARGET RANGE |
| ⋮ | | |

GENERATION OF DIGESTED IMAGE DATA

BACKGROUND OF THE INVENTION

1. Field of the Invention

The present invention relates to a technology for the generation of digested image data from moving image data.

2. Description of the Related Art

Recent years have seen the increasing popularity of technologies by which reduced moving image data, or digested image data, is generated by extracting a portion of moving image data that is recorded using a digital video camera or other moving image recording device. As disclosed in Japanese Patent Laid-Open Nos. 2002-142189 and H10-224736, digested image data can be generated automatically by extracting moving image data in accordance with evaluation values expressing the importance of each still image included in the moving image data.

However, in these methods for automatically generating digested image data, complex correction is required in the event that the automatically generated data is not consistent with the user's intentions. At the same time, it is burdensome for the user to manually generate digested image data. Furthermore, this problem is not limited to the case in which digested image data is to be generated, but also arises during the editing of moving image data in general.

SUMMARY OF THE INVENTION

The present invention was devised in order to resolve the problems with the conventional art described above, and an object thereof is to provide a technology by which to reduce the burden on the user during processing to extract a portion of moving image data that is supplied.

In order to attain the above and the other objects of the present invention, there is provided a method of extracting at least a portion of moving image data from supplied moving image data. The method comprises the steps of: (a) a moving image evaluation step of generating moving image evaluation data by evaluating the supplied moving image data, the evaluation being chronologically performed based on a prescribed condition; (b) a moving image data extraction step of extracting the at least a portion of moving image data from the supplied moving image data based on the moving image evaluation data; and (c) a moving image data classification step of classifying the extracted moving image data into a plurality of classes based on the moving image evaluation data.

Because the moving image data extraction method of the present invention can extract multiple sections of a unit of moving image data based on image evaluation data and classify them into multiple classes, the user can handle these multiple moving image data sections based on such classification. This reduces the burden imposed on the user during extraction of a portion of the supplied moving image data.

In the moving image data extraction method, the method may further comprise a scene separation step of separating the supplied moving image data by scene. The moving image data extraction step may have an extraction mode of performing the extraction by the separated scene.

Because the user often wishes to separate moving images by scene and such classification by scene is relatively reliable and easy to perform, this construction can achieve good results with a simple construction. Here, a 'scene' means a series of images obtained between the commencement of recording and the cessation of recording of moving image data using a camera.

In the moving image data extraction method, the moving image data extraction step may include the steps of: (a) evaluating multiple still image data included in each scene in order to generate multiple still image evaluation values, each of which representing an evaluation value for each of the multiple still image data; (b) calculating an average value of the multiple still image evaluation values for the each scene as the moving image evaluation data; and (c) extracting moving image data comprising a scene having the moving image evaluation data that exceeds a prescribed threshold value, from the supplied moving image data.

In the moving image data extraction method, the method may further comprises a display control step of controlling a display such that each of the extracted moving image data is displayed with respect to each of the classes to which each of the extracted moving image data belongs.

Where each extracted moving image data section is displayed by class in this way, the user can handle the moving image data sections with reference to class. Accordingly, the burden imposed on the user during the handling of moving image data sections can be reduced.

In the moving image data extraction method, the method may further comprise a moving image data file generation step of generating a data file, using the extracted moving image data and data indicative of the class to which the moving image data belongs.

In this case, because information expressing a class is stored in the data file, the burden on the user entailed when managing extracted moving image data can be reduced.

In the moving image data extraction method, the moving image evaluation data may include qualitative data. The moving image data classification step may have a classification mode of performing the classification based on a difference in the qualitative data.

In the moving image data extraction method, the moving image evaluation data may include quantitative data. The moving image data classification step may have a classification mode of performing the classification based on magnitudes of the quantitative data.

The second configuration of the invention provides a digested image data generating method of generating digested image data which is reduced moving image data. The reduction is performed by extracting a portion of moving image data from supplied moving image data, the method comprising the steps included in the above moving image data extraction methods and a moving image data linking the extracted moving image data in order to generate the digested image data, when a number of the extracted moving image data is plural.

In the digested image data generating method, the moving image data linking step may have a linking mode of liking the extracted multiple moving image data chronologically, or, the moving image data linking step may have a linking mode of liking the extracted multiple moving image data based on at least one of the still image evaluation values and the moving image evaluation values.

DESCRIPTION OF THE PREFERRED EMBODIMENTS

Figure 1:
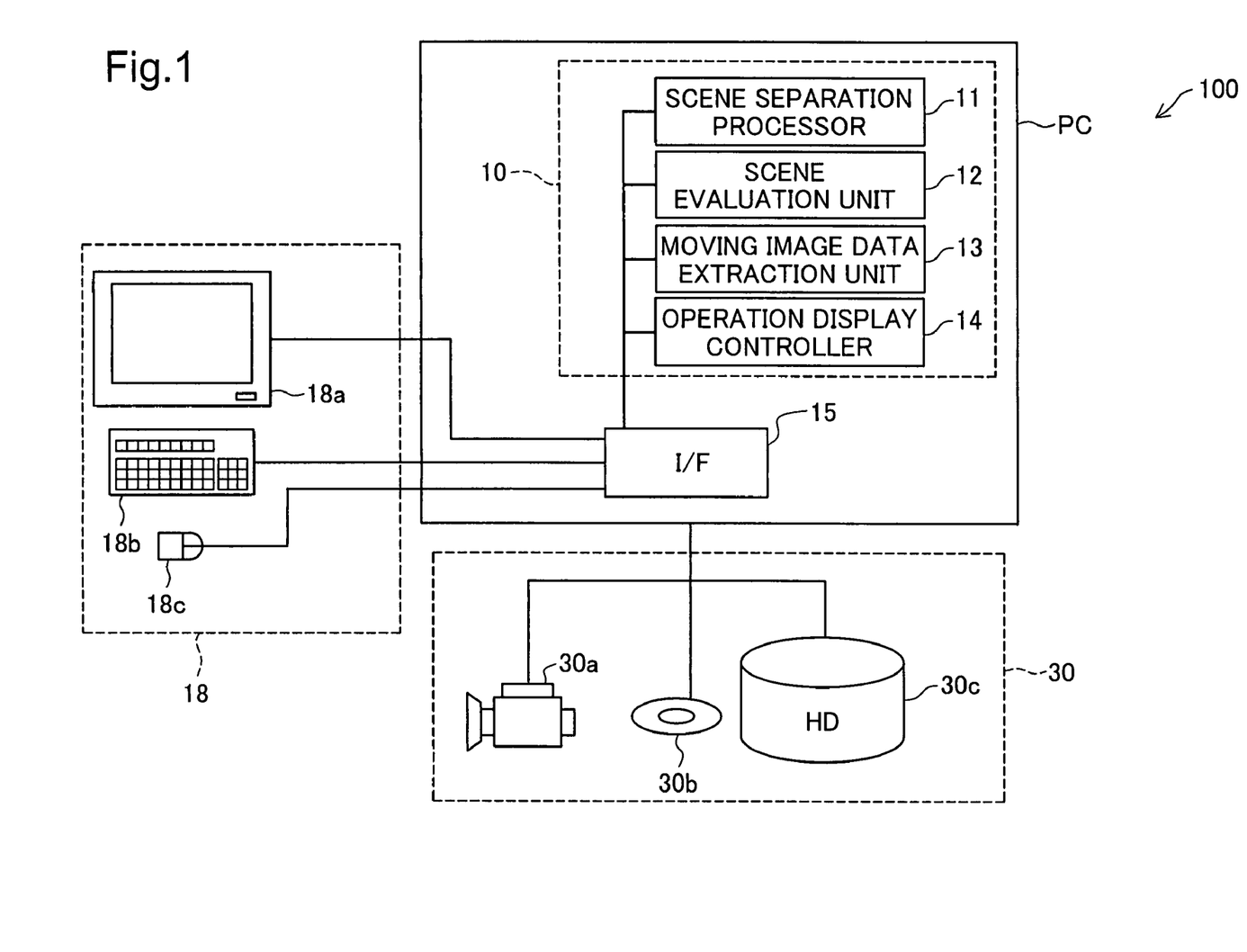
FIG. 1 is an explanatory drawing showing an image processing system 100 comprising an embodiment of the present invention.

Embodiments of the present invention are described below based on examples in the following sequence:
A. Structure of image processing system of an embodiment of the present invention
B. Digested image data generation routine executed in the above embodiment
C. Variations A. Structure of Image Processing System of an Embodiment of the Present Invention FIG. 1 is an explanatory drawing showing an image processing system 100 comprising an embodiment of the present invention. The image processing system 100 includes a moving image database 30 that supplies moving image data, a personal computer PC that generates digested image data by extracting a portion of the moving image data, and a user interface 18 that provides a user interface for the generation of digested image data. The user interface 18 includes a display 18a that displays moving images supplied from the moving image database 30 and operation display screens described below, as well as a keyboard 18b and a mouse 18c that accept inputs from the user.

The personal computer PC includes an image processing application program 10 that executes the processing to generate digested image data from moving image data, as well as an interface 15 that governs the interface between the personal computer PC and external devices such as the moving image database 30 and the user interface 18.

The image processing application program 10 includes a scene separation processor 11 that separates moving image data by scene, a scene evaluation unit 12 that evaluates moving image data by scene, a moving image data extraction unit 13 that extracts moving image data by scene, and an operation display controller 14 that classifies and displays the multiple extracted sections of a unit of moving image data on the display 18a. The scene evaluation unit 12 functions as the 'moving image evaluator' referred to in the Claims of the present invention.

The moving image database 30 has a digital video camera 30a, a DVD 30b and a hard disk 30c as the supply sources for moving image data. In this embodiment, a unit of moving image data comprises a collection of units of frame image data that display still images via the non-interlaced method.

Figure 2:
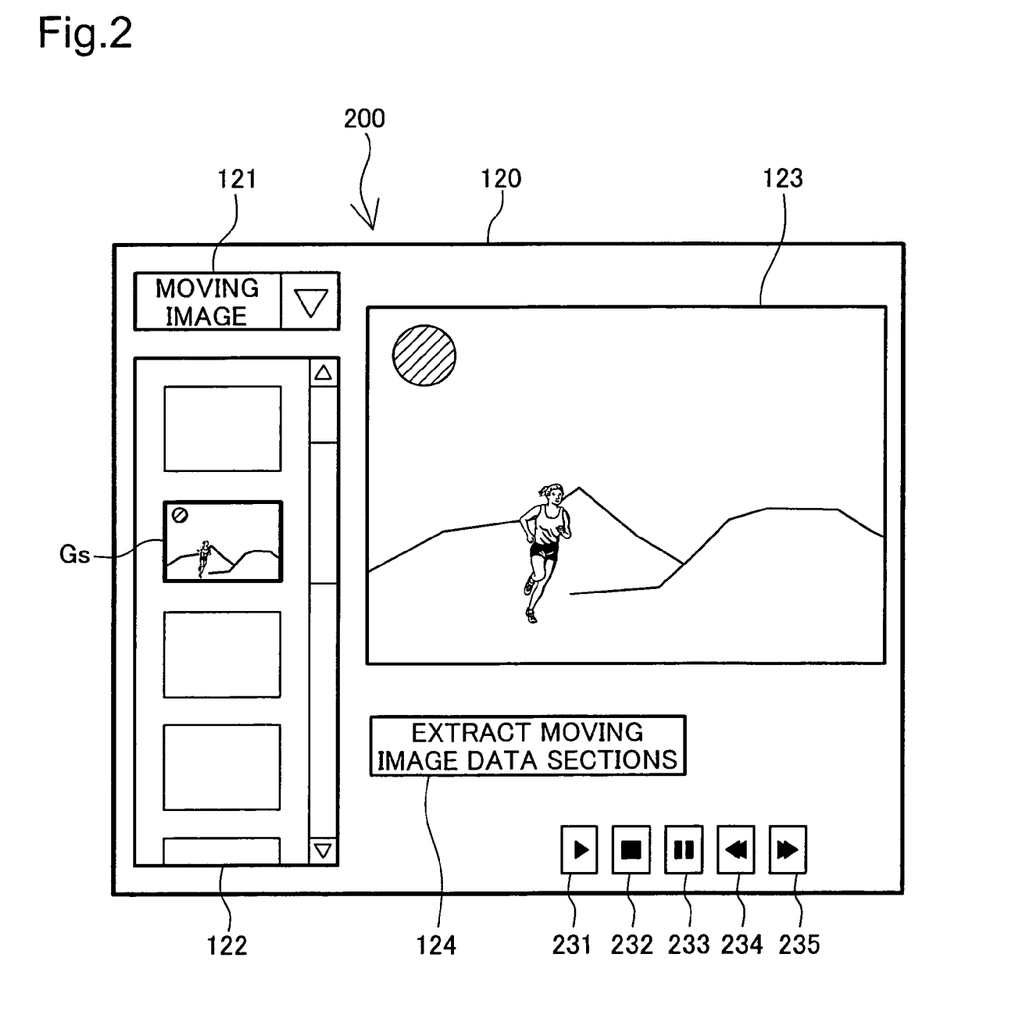
FIG. 2 is an explanatory drawing showing an operation display screen 200 used in a digested image file generation routine executed in the above embodiment of the present invention.

FIG. 2 is an explanatory drawing showing an operation display screen 200 used in a digested image file generation routine executed in the above embodiment of the present invention. The operation display screen 200 is displayed on the display 18a. The operation display screen 200 includes an original image data type selection switch 121 by which to select a type of the original image data comprising the processing target, an original image data selection window 122 by which to select one unit of moving image data from among the various units of original image data of the selected type, an image display area 123 that displays the images expressed by the original image data comprising the processing target, and operation buttons used for the generation of digested image data. The example of FIG. 2 shows a situation in which moving image data Gs has been selected via the original image data selection window 122.

The operation buttons used for the generation of digested image data include a moving image data extraction button 124 by which to extract multiple sections of a unit of moving image data as pre-processing for the automatic generation of digested image data, and various other buttons used for the control of the moving images displayed in the image display area 123. The various buttons used for the control of the moving images include a replay button 231, a stop button 232, a pause button 233, a backward button 234 and a forward button 235.

In the system construction described above, when the moving image extraction button 124 is pressed, multiple sections of a unit of moving image data are extracted from the unit of moving image data as described below, and an editing operation display screen described below that reduces the amount of work required to edit the multiple sections of a unit of moving image data is displayed.

B. Digested Image Data Generation Routine Executed in the Above Embodiment

Figure 3:
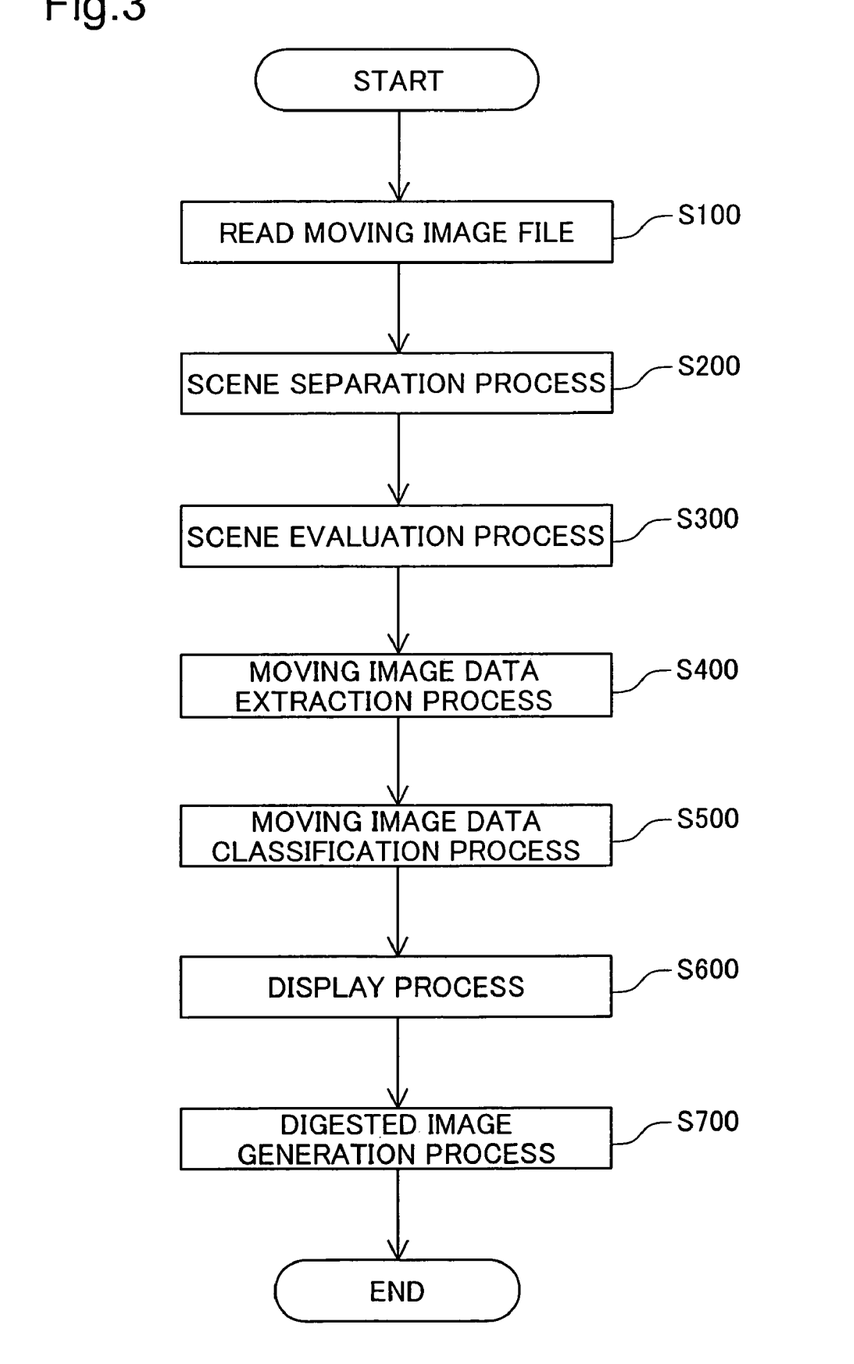
FIG. 3 is a flow chart showing the operations of a digested image data generation routine executed in the above embodiment of the present invention.

FIG. 3 is a flow chart showing the operations of a digested image data generation routine executed in the above embodiment of the present invention. In step S100, the image processing application program 10 (see FIG. 1) receives a unit of moving image data from the moving image database 30. The supplied unit of moving image data is buffered in a memory not shown, and is displayed on the image display area 123 (see FIG. 2).

Figure 4:
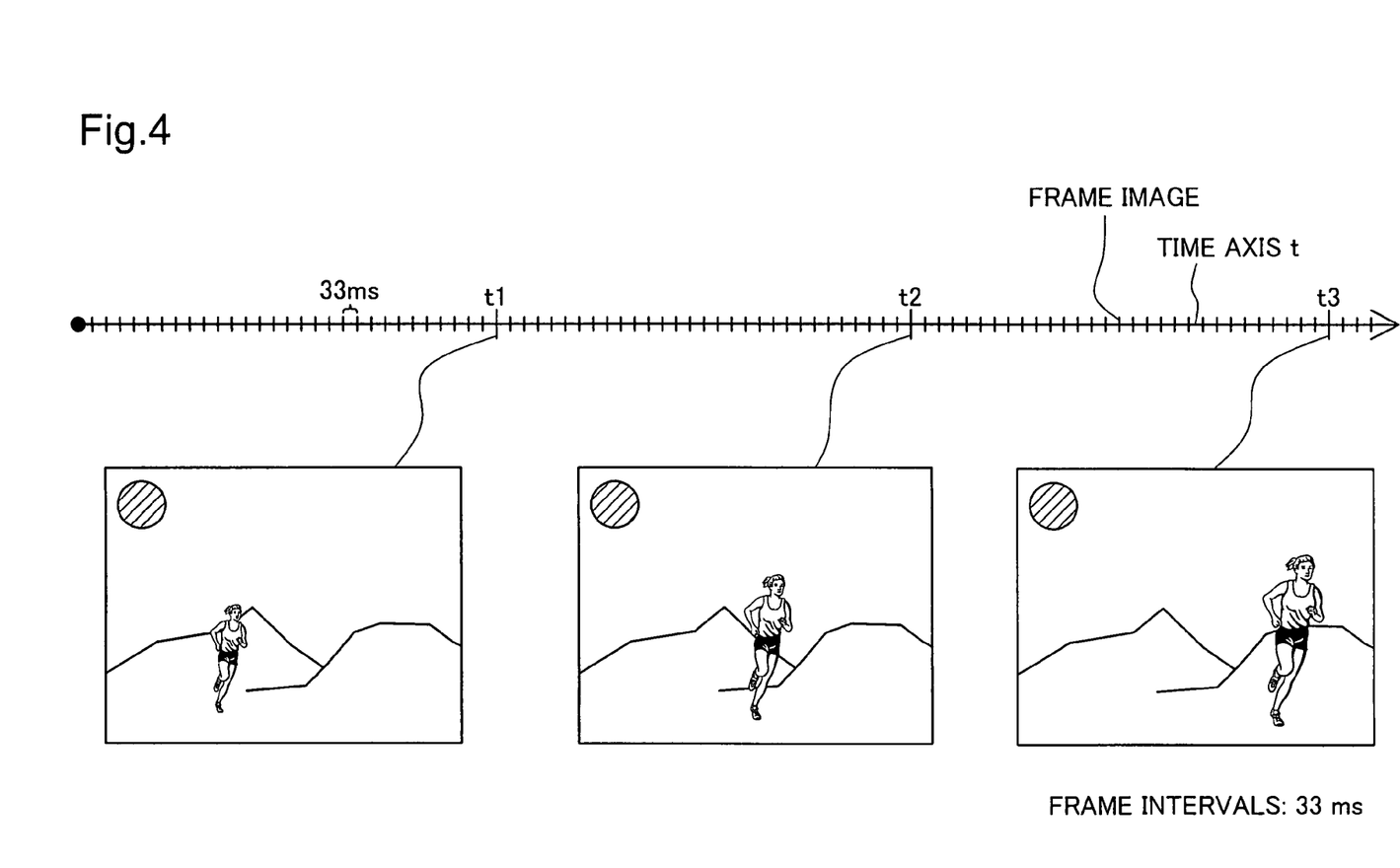
FIG. 4 is an explanatory drawing showing an example of the structure of moving image data used in the above embodiment of the present invention.

FIG. 4 is an explanatory drawing showing an example of the structure of a unit of moving image data used in the embodiment of the present invention. A unit of moving image data comprises a collection of units of chronologically continuous frame image data spaced at 33 ms intervals, and each unit of frame image data has a chronologically-ordered frame number. In the example of FIG. 4, the moving image data shows a marathon runner running.

When the user clicks on the moving image data extraction button 124 after the unit of moving image data comprising the processing target is displayed on the image display area 123, the processing of step S200 begins.

In step S200, the scene separation processor 11 executes a scene separation routine. The scene separation routine comprises processing to separate a unit of moving image data into different sections by scene. In this embodiment, a 'scene' is a series of images obtained between the commencement of recording and the cessation of recording of moving image data using a camera. In other words, each scene begins when recording starts and ends when recording ends. This scene separation routine can be carried out based on recognition of a sudden change in the images, for example.

Figure 5:
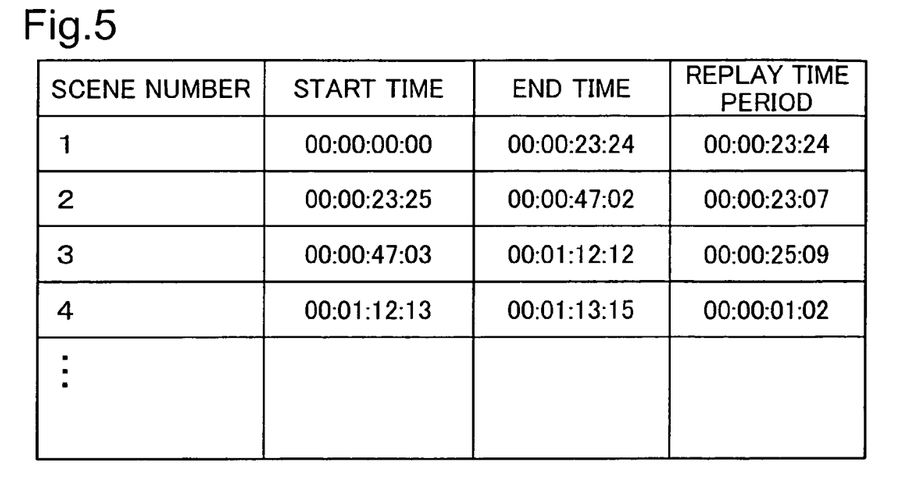
FIG. 5 is a table showing the results of a scene separation routine executed in the above embodiment.

FIG. 5 is a table showing the results of a scene separation routine executed in the above embodiment. In this table, a 'scene number' is a number assigned to each scene obtained as a result of scene separation and is supplied in chronological order. The commencement time and the ending time indicate the time at which the scene starts and the time at which the scene ends, using four sets of two-digit numbers. Specifically, the first two digits indicate the hour, the next two digits indicate the minute, the third two digits indicate the second and the last two digits indicate the frame number at each second. For example, the fourth scene comprises the collection of frames from the 13th frame at 0 hour 1 minute 12 seconds through the 15th frame at 0 hour 1 minute 15 seconds.

In step S300 (see FIG. 3), the scene evaluation unit 12 executes a scene evaluation routine. Scene evaluation routine comprises processing to calculate a scene evaluation value constituting a value that expresses the level of importance of a scene based on the evaluation values for the multiple units of frame image data included in the section of a unit of moving image data comprising the scene. A scene evaluation value can be calculated as an average of the evaluation values for the multiple units of frame image data comprising the scene, for example.

The evaluation value for a unit of frame image data is a numerical indicator showing the level of importance of the still image expressed by the unit of frame image data as a still image evaluation value. Various different methods are available for the determination of such evaluation value, and the methods disclosed in Japanese Laid-Open Patent Nos. 2002-142180 or H10-224736, for example, may be used.

In this embodiment, the frame image data evaluation value is a value between a minimum value '0' and a maximum value '1'. Accordingly, in this embodiment, the scene evaluation value, which comprises an average of the multiple frame image data evaluation values by scene, is also a value between a minimum value '0' and a maximum value '1'. Here, the number of significant figures includes the first two decimal places.

In step S400, the moving image data extraction unit 13 executes a moving image data extraction routine. This moving image extraction routine comprises processing to extract sections of a unit of moving image data comprising scenes that have (1) a scene evaluation value that equals or exceeds a prescribed threshold value Eth, and (2) a scene replay time period that is longer than a prescribed time period Tth. The prescribed threshold value Eth and time period Tth are set to be 0.60 and 5 seconds, respectively, in this embodiment.

In step S500, the moving image data extraction unit 13 executes a moving image data classification routine. The moving image data classification routine comprises processing to classify the multiple sections of a unit of moving image data extracted based on their scene evaluation values into three preset ranks.

Figure 6A:
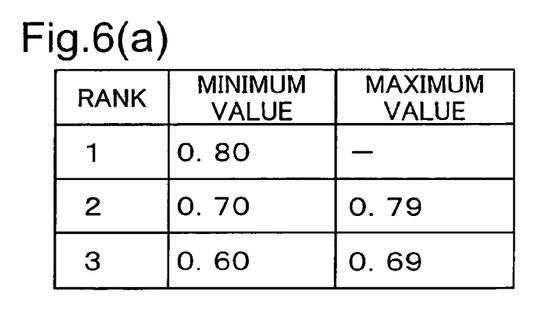
FIGS. 6(a) and 6(b) are explanatory drawings showing the operations of a moving image data classification routine executed in the above embodiment.
Figure 6B:
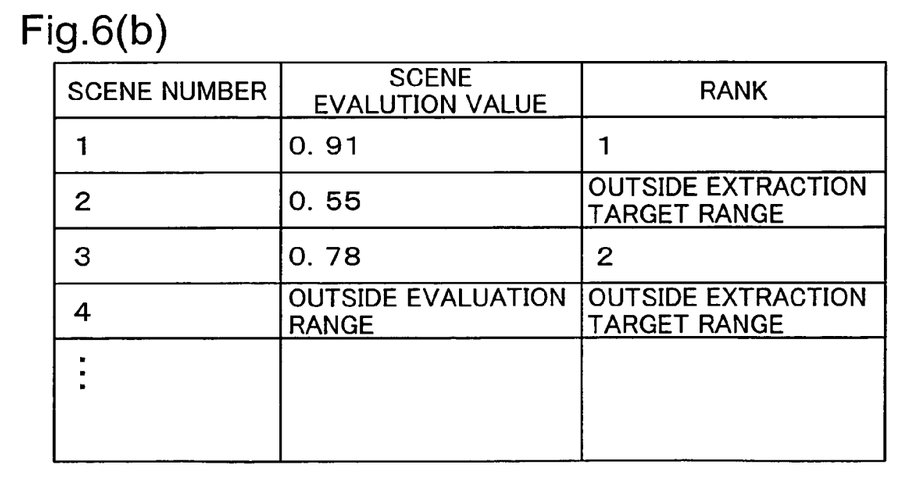

FIGS. 6(a) and 6(b) comprise explanatory drawings pertaining to a moving image data classification routine executed in the above embodiment. FIG. 6(a) shows the relationships between the scene evaluation values and the ranks into one of which each scene is classified. As can be seen from the figure, scenes having a scene evaluation value of 0.80 or larger are classified as rank 1, scenes having a scene evaluation value between 0.70 and 0.79 are classified as rank 2, and scenes having a scene evaluation value between 0.60 and 0.69 are classified as rank 3.

FIG. 6(b) shows classification results as well as the evaluation values for each scene. The scene having the scene number '1' has a scene evaluation value of 0.91, and because its scene evaluation value exceeds 0.80, this scene is classified as rank 1. The scene having the scene number '2' has a scene evaluation value of 0.55, which is smaller than the value of 0.60 comprising the prescribed threshold value Eth, and is therefore deemed outside the extraction target range. The scene having the scene number '3' has a scene evaluation value of 0.78, which falls between 0.70 and 0.79, and is therefore classified as rank 2. The scene having the scene number '4' has an approximately one-second scene replay time period, which is smaller than the prescribed time period Tth (i.e., 5 seconds), and is thus deemed outside the extraction target range.

The moving image data extraction unit 13 then generates moving image files based on the classification results describe above. A moving image data file is generated for each scene. Each moving image data file is generated using moving image data as well as information expressing the classification result. The reason that such moving image data files are generated is that because, when the extracted moving image data sections are put to later use, the information expressing the classification result can be used as a search object, for example, the management burden can be reduced.

Figure 7:
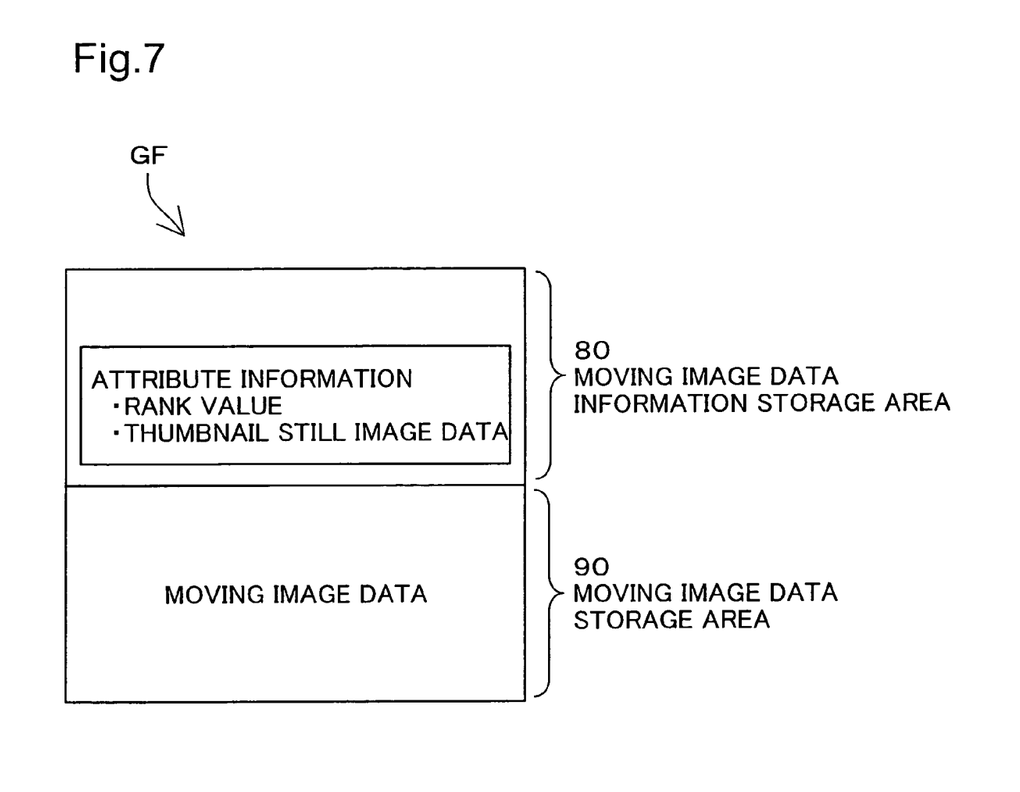
FIG. 7 is an explanatory drawing showing the structure of an image data file GF in the above embodiment.

FIG. 7 is an explanatory drawing showing the structure of an image data file GF in the above embodiment. An image data file GF comprises an moving image data storage area 90 and an moving image data information storage area 80. Stored in the moving image data storage area 90 and the moving image data information storage area 90 are moving image data and the attribute information therefor, respectively.

In the example shown in FIG. 7, a rank value that indicates the classification result and thumbnail image data (a reduced image) are stored in the image data information storage area 80 as attribute information. Thumbnail image data can be generated by selecting a unit of frame image data having the highest frame image data evaluation value among the frame images comprising the scene and adjusting the resolution thereof, for example.

Figure 8:
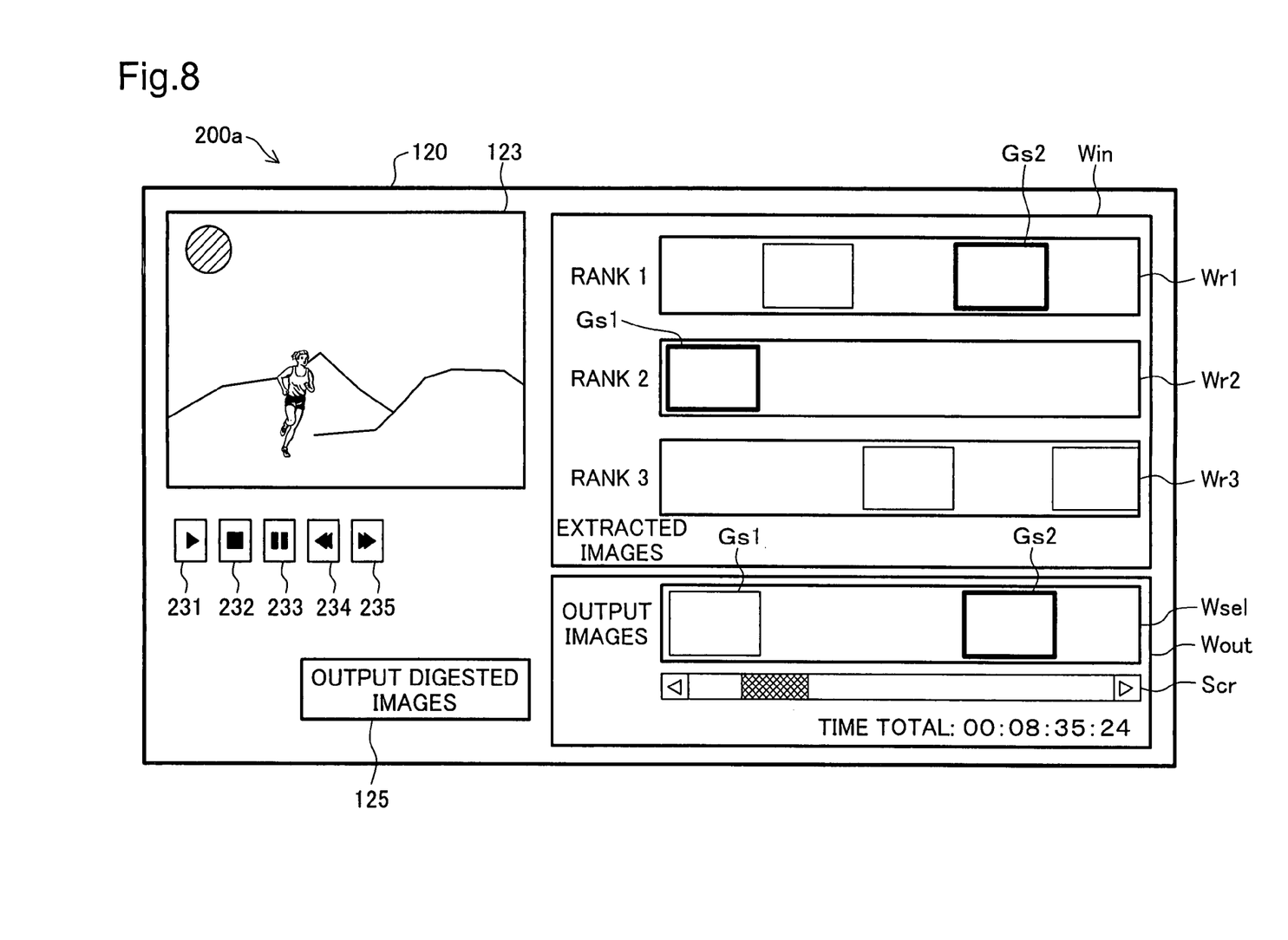
FIG. 8 is an explanatory drawing showing an operation display screen 200a used during the digested image file generation routine executed in the above embodiment of the present invention.

In step S600, the operation display controller 14 displays an operation display screen 200a in which the extracted multiple sections of a unit of moving image data are displayed by rank. This operation display screen 200a is automatically displayed after a certain period of time in response to the clicking of the moving image data extraction button 124 in the operation display screen 200 (see FIG. 2) described above, because the processing of steps S200 through S600 is automatically executed in response to the clicking of this button 124 by the user.

FIG. 8 is an explanatory drawing showing the operation display screen 200a used in the digested image file generation routine executed in the above embodiment. The operation display screen 200a no longer has the original image data type selection switch 121, original image data selection window 122 or moving image data extraction button 124 that were present in the operation display screen 200, but additionally has an input image window Win that displays the images for the extracted multiple moving image data sections using thumbnail images, and an output image window Wout that displays the output images using thumbnail images.

The input image window Win includes a window Wr1 that displays images for moving image data sections having a rank value of 1, a window Wr2 that displays images for moving image data sections having a rank value of 2, and a window Wr3 that displays images for moving image data sections having a rank value of 3. In FIG. 8, two moving image data sections Gs1 and Gs2 are selected. The moving image data section Gs1 is displayed in the window Wr2 using a thumbnail image, and the frame of the thumbnail image is drawn in bold to indicate that the moving image data section Gs1 has been selected. The moving image data section Gs2 is similarly displayed in the window Wr1.

The output image window Wout includes a window Wsel that displays the selected multiple moving image data sections as output images, and a scroll bar by which to laterally scroll the window Wsel and the three windows Wr1, Wr2 and Wr3. The output image window Wout also indicates the replay time period for the digested image data generated by connecting the multiple moving image data sections.

The window Wsel uses thumbnail images to show that the two moving image data sections Gs1 and Gs2 selected in the input image window Win are selected as output images. When a thumbnail image displayed in the window Wsel is clicked on, moving images for that thumbnail image are displayed in the image display area 123.

In step S700, the user generates a digested image data file. A digested image file is generated by clicking on the digested image output button 125. A digested image data file is generated by chronologically connecting the images selected in the input image window Win.

As described above, in this embodiment, because multiple sections are automatically extracted from a supplied moving image data, and are then classified into multiple different ranks and shown to the user by rank, the burden imposed on the user when multiple moving image data sections are handled during generation of a digested image data file can be reduced.

C. Variations

The present invention is not limited to the embodiment or examples described above, and may be implemented in various other forms within the essential scope of the invention. The variations described below, for example, are also possible.

C-1. The embodiment described above is constructed such that moving image data sections that are shorter than the prescribed time period are excluded, but instead of automatic exclusion, it is acceptable if the user can exclude these sections manually after digested image data has automatically been generated. It is preferred that the above prescribed time period Tth be made adjustable by the user.

C-2. In the embodiment described above, the extracted multiple sections of a unit of moving image data are chronologically linked, but the order thereof may be determined based on the still image evaluation values, the moving image evaluation values, or a combination thereof.

C-3. In the embodiment described above, after a unit of moving image data is separated into sections by scene, scenes or moving image data sections are extracted, but instead of separating the unit of moving image data into scenes, such extraction may be carried out as to obtain a collection of units of frame image data having a high evaluation value.

C-4. The embodiment described above is constructed such that digested image data can be generated by connecting extracted multiple sections of a unit of moving image data, but it is also acceptable if the present invention is constructed as a moving image data extraction apparatus that provides extracted multiple sections of a unit of moving image data as individual moving image data files that include information indicating the classification result, without connecting such extracted multiple moving image data sections.

C-5. In the embodiment described above, a portion is extracted from a unit of moving image data, but it is also acceptable if the entire unit of moving image data is extracted. In this case, the moving image data extraction apparatus may also be deemed a moving image data separation apparatus. Such a construction can be realized using the above embodiment while classifying scenes having a scene evaluation value between 0.00 and 0.69 as rank 3 and extracting them even if their scene replay time period is short.

C-6. In the embodiment described above, a moving image data file including a rank value is generated for each scene after extraction of moving image data sections, but it is also acceptable if display is carried out on the operation display screen 200a without the generation of such moving image data files. Such a construction can be realized by generating data to operate the multiple frame images comprising the supplied unit of moving image data.

C-7. In the embodiment described above, a unit of moving image data comprises units of non-interlaced frame image data, but the present invention can be applied to interlaced moving image data as well. In this case, a unit of frame image data in the embodiment described above corresponds to still image data generated from still image data for odd-numbered fields comprising image data for odd-numbered scanning lines and still image data for even-numbered fields comprising image data for even-numbered scanning lines.

C-8. In the embodiment described above, moving image data sections are extracted based on the evaluation values for the frame image data included therein, but moving image data sections may be extracted based on audio data included therein. Furthermore, a rank value may be determined based on the audio data.

C-9. In the embodiment described above, classification is carried out based on quantitative information, but classification may instead be performed based on qualitative information. For example, it is acceptable if the image capture object is presumed to be a person or scenery based on frame image data, and classification of scenes is made based on this presumption. Alternatively, it is acceptable if only scenes in which a particular person's voice is heard, as well as scenes immediately before and after such scenes, are extracted.

Some of the functions realized via hardware in the embodiment described above may be realized via software instead, and conversely, some of the functions realized via software may be realized via hardware instead.

Where some or all of the functions of the present invention are realized via software, such software (i.e., a computer program) may be provided on a computer-readable recording medium. In the present invention, a 'computer-readable recording medium' is not limited to a portable recording medium such as a flexible disk or CD-ROM, but also includes a computer internal storage device such as a RAM or ROM, as well as an external storage device fixed in a computer such as a hard disk.

Japanese Laid-Open Patent 2004-082481 (filed on Mar. 22, 2004), based on which this application claims a priority right, is incorporated by reference in this disclosure.

What is claimed is:

1. A computer program product for causing a computer to extract at least a portion of moving image data from supplied moving image data, the computer program product comprising:
   a computer readable medium; and
   a computer program stored on the computer readable medium, the computer program comprising
      a moving image evaluation program for causing the computer to generate moving image evaluation data by evaluating the supplied moving image data, the evaluation being chronologically performed based on a prescribed condition,
      a moving image data extraction program for causing the computer to extract the at least a portion of moving image data from the supplied moving image data based on the moving image evaluation data, and
      a moving image data classification program for causing the computer to classify the extracted moving image data into a plurality of classes based on the moving image evaluation data, wherein the computer program further comprises a scene separation program for causing the computer to separate the supplied moving image data by scene, wherein the moving image data extraction program has an extraction mode of performing the extraction by the separated scene, and wherein the moving image data extraction program comprises a program for causing the computer to evaluate multiple still image data included in each scene in order to generate multiple still image evaluation values, each of which representing an evaluation value for each of the multiple still image data a program for causing the computer to calculate an average value of the multiple still image evaluation values for the each scene as the moving image evaluation data, and a program for causing the computer to extract moving image data comprising a scene having the moving image evaluation data that exceeds a prescribed threshold value, from the supplied moving image data.

2. A computer program product for causing a computer to generate digested image data which is reduced moving image data, the reduction being performed by extracting a portion of moving image data from supplied moving image data, the computer program product comprising:

a computer readable medium; and a computer program stored on the computer readable medium, the computer program comprising a moving image evaluation program for causing the computer to generate moving image evaluation data by evaluating the supplied moving image data, the evaluation being chronologically performed based on a prescribed condition, a moving image data extraction program for causing the computer to extract the at least a portion of moving image data from the supplied moving image data based on the moving image evaluation data, and a moving image data classification program for causing the computer to classify the extracted moving image data into a plurality of classes based on the moving image evaluation data, wherein the computer program further comprises a program for causing a computer to link the extracted moving image data in order to generate the digested image data, when a number of the extracted moving image data is plural.

* * * * *